(12) United States Patent
Eickens

(10) Patent No.: US 10,994,298 B2
(45) Date of Patent: May 4, 2021

(54) METHOD FOR INTRODUCING AN APPLICATION MEDIUM INTO A WEAKENING GAP OF A COVER, AND PREFERRED APPLICATION DEVICE

(71) Applicant: KRAUSSMAFFEI TECHNOLOGIES GMBH, Munich (DE)

(72) Inventor: Sebastian Eickens, Kevelaer (DE)

(73) Assignee: KRAUSSMAFFEI TECHNOLOGIES GMBH, München Bayern (DE)

( * ) Notice: Subject to any disclaimer, the term of this patent is extended or adjusted under 35 U.S.C. 154(b) by 0 days.

(21) Appl. No.: 16/348,310

(22) PCT Filed: Nov. 9, 2017

(86) PCT No.: PCT/EP2017/078788
§ 371 (c)(1),
(2) Date: May 8, 2019

(87) PCT Pub. No.: WO2018/103998
PCT Pub. Date: Jun. 14, 2018

(65) Prior Publication Data
US 2019/0291129 A1    Sep. 26, 2019

(30) Foreign Application Priority Data

Dec. 6, 2016 (DE) ............... 10 2016 123 579.2

(51) Int. Cl.
*B26D 3/08* (2006.01)
*B05C 5/02* (2006.01)
(Continued)

(52) U.S. Cl.
CPC ............ *B05C 5/02* (2013.01); *B26D 3/08* (2013.01); *B26D 3/085* (2013.01); *B62D 25/14* (2013.01); *B60R 21/2165* (2013.01)

(58) Field of Classification Search
CPC .................................................. B26D 3/085
See application file for complete search history.

(56) References Cited

U.S. PATENT DOCUMENTS

| 2,207,100 A | * | 7/1940 | Maynard | ............ B29D 30/52 |
| | | | | 156/128.6 |
| 5,082,310 A | * | 1/1992 | Bauer | ............ B26D 3/085 |
| | | | | 280/728.3 |

(Continued)

FOREIGN PATENT DOCUMENTS

| DE | 102005050940 B3 | 12/2006 |
| DE | 102006034287 B3 | 2/2008 |

(Continued)

OTHER PUBLICATIONS

International Search Report for PCT/EP2019/078788 dated Jan. 26, 2018.
Written Opinion for PCT/EP2019/078788 dated Jan. 26, 2018.

*Primary Examiner* — Nathan H Empie
(74) *Attorney, Agent, or Firm* — Pearne & Gordon LLP

(57) ABSTRACT

The invention relates to a method for introducing an application medium into a weakening gap (5) of a cover (4), such as a covering film or covering skin, wherein a cover (4) is provided which already has a weakening gap (5) formed completely over the length thereof on a first side (6), an application device (2) is positioned toward the first side (6), at a distance from the cover (4) and above the weakening gap (5), wherein a support is arranged in a supporting manner on a second side (7) of the cover (4), facing away from the application device (2), and an application of the application medium into the weakening gap (5) by the application device (2) is carried out. The invention further relates to an application device (1) for this method.

7 Claims, 4 Drawing Sheets

(51) Int. Cl.
*B62D 25/14* (2006.01)
*B60R 21/2165* (2011.01)

(56) References Cited

U.S. PATENT DOCUMENTS

2006/0049158 A1* 3/2006 Schurmann .......... B23K 26/044
 219/121.83
2010/0005941 A1* 1/2010 Schueppstuhl .......... B26D 7/20
 83/879

FOREIGN PATENT DOCUMENTS

| DE | 202007017917 U1 | 3/2008 |
| JP | 2008284653 A * | 11/2008 |
| JP | 2008284653 A | 11/2008 |
| WO | 2008009488 A1 | 1/2008 |
| WO | 2008141877 A1 | 11/2008 |

* cited by examiner

METHOD FOR INTRODUCING AN APPLICATION MEDIUM INTO A WEAKENING GAP OF A COVER, AND PREFERRED APPLICATION DEVICE

CROSS-REFERENCE TO RELATED APPLICATIONS

This is a National Stage application of PCT international application PCT/EP2017/078788, filed on Nov. 9, 2017, which claims the priority of German Patent Application No. 10 2016 123 579.2, filed Dec. 6, 2016, both of which are incorporated herein by reference in their entireties.

FIELD OF THE INVENTION

The invention relates to a method for introducing an application medium (liquid or solid (for instance as a powder)) into a weakening gap of a cover/laminar workpiece, such as a covering film/decorative film or covering skin/decorative skin. The cover per se is preferably realized for use in a motor vehicle, in particular in an instrument panel of a motor vehicle, for example as outer cover of an airbag towards the vehicle occupant. In addition, the invention relates to a method for forming a weakening gap in a cover and a preferred application device for introducing the application medium into the weakening gap of the cover.

BACKGROUND OF THE INVENTION

For particular fields of application, it is necessary to introduce into laminar elements weakening gaps for instance in the form of weakening cuts which, for example, define a predetermined breaking point. One field of application is the production of instrument panels for motor vehicles with an integrated airbag, wherein upon triggering of the airbag the instrument panel is broken open at the designated site, in particular the weakening sites, so that the airbag can emerge.

The term "film" or "skin" which is used is understood to mean plastic skins, plastic films or corresponding laminar workpieces, in which the aim is to incise the material from one side so that a defined residual wall thickness is produced, independently of the possibly locally fluctuating wall thickness and the tolerances of a relative movement from tool to tool which is robotically guided or is carried out by other automated moving devices, such as for example CNC machines. A high degree of accuracy of the cut, a high degree of process reliability and a good process documentation are important especially in the introduction of a weakening into the skins of automobile instrument panels in the region of the airbag, which are to be regarded as safety components.

The introduction of separating media/application media is always necessary whenever is must be assumed that the film base material tends to be subject to a self-healing effect. This means that the weakening cut closes again under the influence of environmental factors such as temperature, ageing or chemical reaction, or else without external influential factors. This effect can occur very quickly, i.e. in a short space of time from the separating process, or else only after years. Covers/films based on polyurethane and also PVC are particularly affected.

In order to prevent this effect of the reclosing of the weakening, the flanks of the cut a frequently moistened with a separating medium. This medium acts as a spacer between the flanks of the cut. A further reason for the use of separating medium can also be a preventing of the adhesion of the PU material which is used in the instrument panel construction. Through the fact that the flanks of the cut are moistened with the separating medium, the PU material which is used can also not adhere to these flanks of the cut and in the immediate vicinity of the weakening gap, or the flanks of the cut can not stick to one another and thereby influence the weakening effect (predetermined breaking point effect) of the cut.

Likewise, however, the present method can also be used to seal the weakening course. This means that no separating medium, but rather a targeted adhering by a suitable adhesive or a sealing lacquer is carried out. This is used when the invention is primarily intended to prevent the penetration of PU material into the weakening cut in the subsequently process step of the instrument panel construction.

Generic prior art is already sufficiently known. In this context, for instance DE 10 2005 050 940 B3 discloses a device for incising a weakening line into a film. The device comprises a blade with a blade tip pointing in the cutting direction, with a blade holder and with a channel for the delivery of a liquid behind the blade tip into the weakening line.

A device formed purely for the introduction of a weakening cut into a film or skin is known from DE 10 2006 034 287 B3.

A method known from the prior art for introducing a separating medium is consequently embodied so that the separating medium is applied during the cutting process via the cutting blade or small dosing tubes carried along on the cutting head, in the region of the immediate cutting process. This means that the cutting blade or respectively the cutting head is inserted with the small dosing tubes directly as an applicator of the separating medium.

However, it has been found to be disadvantage here that the input of separating medium is directly connected with the cutting process. This arrangement leads to all disturbances from the application of separating medium having a direct influence on the cutting process and the evaluation of the component. In addition, the weakening gap can only be moistened with separating medium when the medium is applied via the blade in connection with the cutting process. Therefore, disadvantages arise in the possibilities for process monitoring, in the process management and in the programming of the application and a dosing technique which is more susceptible to malfunctioning.

BRIEF SUMMARY OF THE INVENTION

It is therefore the object of the present invention to eliminate the disadvantages known from the prior art and in particular to improve the process stability during the applying of an application medium into a weakening gap of a cover.

This is solved according to the invention by the features of Claim 1, wherein a method is claimed for introducing an application medium into a weakening gap of a cover, such as a covering film or covering skin, wherein a cover is provided which already has a weakening gap formed completely over the length thereof on a first side, an application arrangement (prepared for applying the application medium) is positioned toward the first side, at a distance from the cover and above the weakening gap, and a support is arranged in a supporting manner on a second side of the cover, facing away from the application arrangement, and an application of the application medium into the weakening gap is carried out by the application arrangement.

The application process is therefore clearly separated with respect to he introduction process of the weakening gap, so that the two processes do not directly influence each other. The application of the application medium is clearly uncoupled from the cutting process. This enables a separate working process, independent of the cutting process, which working process, however, is able to be carried out within a facility. The process stability is thereby substantially improved.

Further advantageous embodiments are claimed in the subclaims and are explained in further detail below.

In the implemented method, the following states can therefore be present at the same time: The cover, processed by a (completed) cutting process is present. In addition, an application head is arranged above the cover, on the first side of the cover, i.e. the side of the weakening gap. Again at the same time therefore the support is brought onto the cover to the (second) side facing away from the weakening gap, so that the weakening gap opens up. When these three conditions are fulfilled, the separating medium can be applied via the application head. This state is obtained over the entire trajectory of the weakening gap and is moved forwards by the automated moving device or another feed unit along the weakening course.

It is particularly advantageous if the cover is applied on the support (preferably under prestressing/prestressd), in such a way that the weakening gap opens up/widens locally in the direction of the application arrangement in a portion which lies opposite a support region applied on the support, (so that the application medium is applied/injected into the opened up weakening gap/onto the flanks of the opened up weakening gap). In other words, the cut gap (weakening gap), which has arisen through the preceding cutting process, is thereby automatically opened up by a tool (application device) in such a way that an introduction, such as a spraying in, of the application medium into the weakening gap is made possible. Thereby, as complete a moistening of the weakening gap as possible by the application medium is implemented. It is basically possible here to provide the support and the application arrangement in a shared application device and, through a suitable lifting of the entire application device, for instance by an automated moving device, to also lift the cover, wherein the cover is then preferably fixed in a device/product mount, so that the weakening gap opens up minimally. However, further types of mount are basically conceivable.

In a variant, the application arrangement can be configured as an application head, for example as a spray head. The application arrangement or the application head can have an application nozzle, for example a spray nozzle.

It is particularly expedient if the discharge of the application medium is monitored (metrologically) by a drip monitoring after the exit of the application medium from an application nozzle of the application arrangement, configured as an application head.

When the support is pressed resiliently onto the second side of the cover, the cover can be prestressed as uniformly as possible in the region of the weakening gap with a predetermined force.

When the application medium is a separating medium or an adhesive closing the weakening gap again temporarily at least partially, more preferably completely, said adhesive being particularly preferably developed for subsequent re-separation, the application medium is particularly suitable for use in a predetermined breaking point.

With regard to the support, it is in addition advantageous if the support has a slide- or roller bearing, by which the cover is in rolling/sliding contact during the introduction of the application medium. Thereby, the cover is guided on the support in a particularly gentle manner. In this respect, however, it is also basically possible to use different supports, thus e.g. surfaces formed integrally with a support table, preferably convex surfaces, or three-dimensionally movable blocks.

It is also advantageous if the cover is moved relative to the application arrangement and/or the application arrangement is moved relative to the cover in such a way that a distance is kept constant between the application arrangement and the cover in a displacement path along the weakening gap. Accordingly, a method is provided with an arrangement by which the distance between the application arrangement and a support is formed so as to be constant along the weakening gap/cutting axis. When the distance between the support and the application arrangement is constant and when the cover rests continuously against the support, this leads to a particularly constant application width of the medium on the cover. A non-contact application of the application medium by an application process is thereby realized. The process management is thereby substantially improved.

When a controlling and/or regulating arrangement is present, which keeps the distance between the application arrangement and the cover constant in the displacement path along the weakening gap, the distance is able to be controlled particularly reliably.

In this connection, it is also advantageous if the controlling- and/or regulating arrangement detects a position of the application arrangement and a position of the support and, depending on this position, moves the application arrangement relative to the support, whilst maintaining a predetermined distance between the cover and the application arrangement. Thereby, the controlling/regulating of the distance is implemented particularly effectively.

Furthermore, it is advantageous if the application arrangement is connected/coupled indirectly or directly with the support during the applying of the application medium, or is guided securely relative to the support. Thereby, the distance between application arrangement and cover is kept constant in a simple manner.

In this respect, it is particularly expedient if the application arrangement is coupled with the support mechanically, preferably via a bracket-like connecting arrangement (for example a C- or U-frame). In this connection, it is further preferred to configure the connecting arrangement in several parts. On a first component of the connecting arrangement, the application arrangement is then mounted, whereas on a second component of the connecting arrangement the support is arranged. Further preferably, these two components are displaceable and/or pivotable relative to one another. In this connection, it is furthermore also advantageous if the two components are displaceable and/or pivotable relative to one another electromotively, hydraulically and/or pneumatically.

In addition, the invention relates to a method for processing a cover, such as a covering film or covering skin, wherein firstly a weakening gap is introduced completely on a first side of the cover by means of a separating tool, and subsequently, after removal of the separating tool from the cover, the method is carried out according to one of the previously described embodiments.

Furthermore, the invention relates to an application device, preferably in the form of a spray device/a spray tool, for introducing an application medium into a weakening gap of a cover, i.e. for carrying out the previously described method for introducing an application medium into the weakening gap, with an application arrangement, prepared for applying/spraying the application medium, preferably in the form of a spray head, wherein a support is present which cooperates with the application arrangement such that a distance is securely adjustable or adjusted between the support and the application arrangement. This enables a particularly precise embodiment of the previously described method.

Likewise in this respect, it is again expedient if the support is connected mechanically with the application arrangement, preferably via the bracket-like connecting arrangement.

BRIEF DESCRIPTION OF THE DRAWINGS

The invention is now explained in further detail below by means of the figures in connection with various example embodiments.

There are shown.

The figures are only diagrammatic in nature and serve exclusively for an understanding of the invention. The same elements are provided with the same reference numbers. The individual features of the different example embodiments can also be freely combined with one another.

DESCRIPTION OF EXAMPLE EMBODIMENTS

Figure 1:
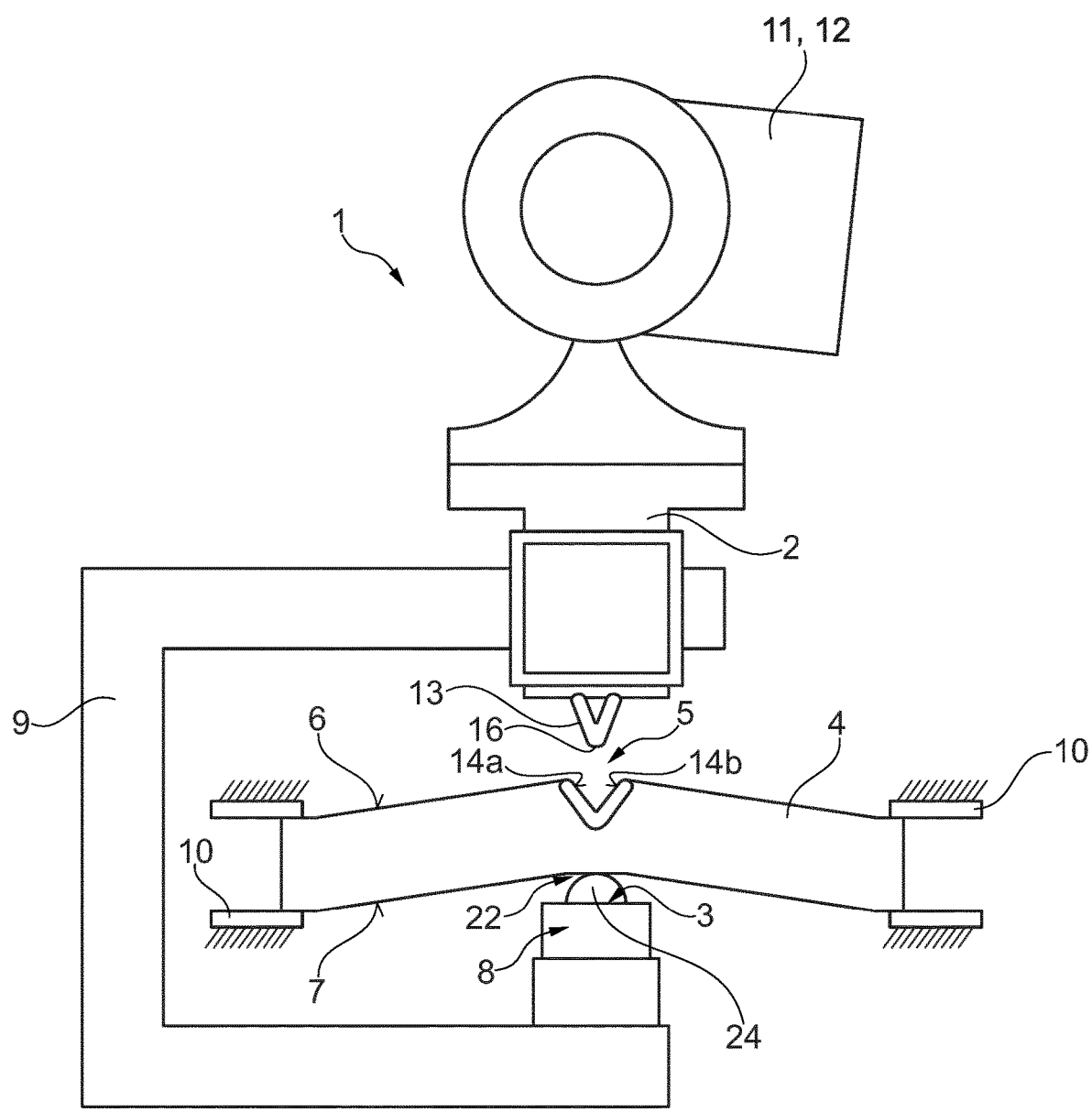
FIG. 1 a side view of an application device according to the invention in accordance with a first example embodiment which, for carrying out a method according to the invention for introducing an application medium into a weakening gap is already arranged on a cover, wherein a support of the application device is pressed against a (second) side of the cover facing away from an application head, so that a weakening gap is opened up on a (first) side of the cover facing the application head, FIG. 2 a side view of the arrangement of application device and cover according to FIG. 1, wherein the arrangement, is not illustrated as in FIG. 1 in an illustration plane perpendicularly to the weakening gap, but rather in an illustration plane along the weakening gap, FIG. 3 a side view of an application device according to the invention in accordance with a second example embodiment, wherein two components of a connecting arrangement of the application device, coupling the application head with the support, are articulatedly connected with one another, FIG. 4 a side view of an application device according to the invention in accordance with a third example embodiment, wherein a component of the connecting arrangement, receiving the support, is displaceable pneumatically relative to a component of the connecting arrangement receiving the application head, FIG. 5 a side view of an application device according to the invention in accordance with a fourth example embodiment, wherein a component of the connecting arrangement receiving the application head is displaceable pneumatically relative to a component of the connecting arrangement receiving the support, FIG. 6 a side view of an arrangement of an application device and of a support, formed separately from the application device, for carrying out the method according to the invention in accordance with a further example embodiment, wherein the application device now has only an application head arranged on an automated moving device, and the support is configured in the form of a convexly curved surface of a support table, and FIG. 7 a side view of an arrangement of an application device and of a support, formed separately from the application device, for carrying out the method according to the invention in accordance with a further example embodiment, wherein the application device again has only an application head arranged on an automated moving device and the support is configured in the form of a displaceable support block.

In FIG. 1 a preferred arrangement is illustrated for carrying out a method according to the invention. The arrangement has an application device 1/an application tool according to a preferred example embodiment. In addition to the application device 1, the arrangement has a base holder 10, in which a cover 4 is received/clamped. The cover 4 forms a thin-walled, laminar workpiece. The cover 4 is therefore also designated alternatively as covering film/decorative film or covering skin/decorative skin. The cover 4 is preferably embodied as a component of an instrument panel of a motor vehicle, for example as outer cover of an airbag. The cover 4 consists of a plastic. Particularly preferably, the cover is produced at least partly from a polyurethane (PU) and/or PVC, wherein basically, however, also other materials are able to be used.

Furthermore, the cover 4 which is processed in the method according to the invention, as can also be readily seen in FIG. 1, already has a weakening gap 5 extending on a first side 6/surface. The weakening gap 5 is preferably incised into the cover 4, so that the weakening gap 5 is also designated as a weakening cut.

The application device 1 per se is preferably able to be arranged on an automated moving device 11, and in this example embodiment is also arranged on an arm 12 of the automated moving device 11, which is only partially illustrated here for the sake of clarity. The automated moving device 11 can be embodied as an articulated robot. Alternatively, the automated moving device can basically be replaced by any other feed unit. The application device 1 has an arrangement 2, which in the present embodiment is configured as an application head 2 and therefore is also designated as such in the following. The application head 2 has in particular an application nozzle 13/spray nozzle, by means of which the application medium which is to be discharged is introduced into the weakening gap 5 of the cover 4. Therefore, the application medium is applied, preferably acted upon by pressure, through the application nozzle 13 (cross-section constriction). In this respect, however, it is to be pointed out that the application can basically be embodied differently. Thus, in further embodiments, a pressureless application, for instance by an instilling, is also possible.

Furthermore, alternatively to the distanced application of the application medium, such as by the spraying, a contact application of the application medium can take place. Preferably, in a further embodiment, not illustrated in further detail here for the sake of clarity, a small application tube or an application rail (with or without contact with the cover 4) instead of the application nozzle or the application nozzle 13 is then arranged downstream, or even provided instead of the entire application head 2. The application rail can (like a profile) have a C-, V- or U-shaped form in cross-section.

The small application tube or the application rail is then directed over the surface along the weakening gap 5. This means that at the location at which the application head 2 in the example embodiment illustrated in FIG. 1 is situated, a small application tube or an application rail could also be situated, which is directed in a non-contact manner or preferably as a small drag tube or drag rail with contact over the surface with the weakening gap 5 by the automated moving device 11. The small drag tube or the drag rail has the advantage, compared with trickling, that no drop formation takes place with the depositing of a bulk drop on reaching the critical detachment quantity on the small application tube or on the application rail (discontinuous discharge). Instead, a continuous discharge takes place via a drag track of the application medium on the surface of the cover 4 along the weakening line course. In this alternative example embodiment, the discharge of the application medium can take place in a pressureless manner or as a pressure jet. The outlet opening on the small tube or on the rail can be embodied here so as to be round or else in a different geometry (for instance flat, angular, V-, C-, U- or O-shaped), in order to be able to influence a moistening of the weakening gap course with the application medium optimally and in the desired geometric characteristic. This described small tube application or rail application is basically able to be implemented in all support variants, in particular also in the example embodiments described below.

The application medium is preferably embodied in the form of a separating medium, but can alternatively also be embodied in the form of an adhesive agent/adhesive.

To supply the application nozzle 13 with the application medium, the application head 2 is in addition further connected with a pump or respectively with a fluid tank by means of a supply line, not illustrated further here for the sake of clarity, so that the application nozzle 13 is constantly supplied with the application medium during the introducing of the application medium into the weakening gap 5.

An arc-like/bracket-like connecting arrangement 9 of the application device 1 extends away out from the application head 2. The connecting arrangement 9 is illustrated here only in a simplified manner. The connecting arrangement 9 extends three-dimensionally such that it extends around the base holder 10, in which the cover 4 is received. On an end of the connecting arrangement 9 facing away from the application head 2, a support 3 is arranged. The support 3 is provided for placing-on/pressing-on on the cover 4. The connecting arrangement 9 extends in such a manner around the base holder 10 and the cover 4 that the application head 2 ultimately in the application mode according to FIG. 1 is arranged on a first side 6 of the cover, over the weakening gap 5, whereas the support 3 is arranged on a second side 7 opposed to/opposite the first side 6. The connecting arrangement 9 is configured here rigidly/as a rigid coupling, so that support 3 and application head 2 are arranged at a fixed distance relative to one another and are coupled directly to one another. Therefore, in other words, a mechanical coupling, in particular a rigid mechanical coupling, is formed between the application head and the support 3. Thereby, support 3 and application head 2 are connected to one another indirectly or directly via a mechanical construction formed by the connecting arrangement 9, wherein—apart from elastic effects—no change in distance at all can occur between the two relevant parts, namely the support 3 and the application head 2. Such a coupling is achieved by means of a bracket in the form of the connecting arrangement 9, which bracket indirectly or directly connects the application head 2 and the support 3 to one another.

The support 3 has a rolling body in the form of a rolling ball 24, by which it is pressed against the cover 4 during the introduction of the application medium. However, as described in further detail below, the support 3 can basically also be embodied differently. In particular in this example embodiment according to FIG. 1 the rolling ball 24 is prestressed resiliently with respect to the connecting arrangement 9 (by means of a spring arrangement). A pressing device 8, the structure of which is not illustrated in further detail, which presses the rolling ball 24 elastically against the cover 4, serves for this. The pressing device 8 has a spring element which is clamped between the connecting arrangement 9 and the rolling ball 24. Alternatively to the rolling ball 24, the support 3 can, however, basically also have any other type of contact arrangement/element, which appears suitable for pressing against the cover 4. In order to be able to reproduce application line progressions of any desired configuration, it can be advantageous to embody the support 3/counter holder, alternatively to the movable ball/rolling ball 24, also as a slide bearing surface, in order to enable a movement in the feed direction. Through this provision, the bracket/connecting arrangement 6 can be held in a position which permits an optimum access to the workpiece. Likewise, it is possible to replace the ball/rolling ball 24 by a movable roller which is mounted onto an additional and synchronized rotary drive.

Therefore, an arrangement is always provided which ensures a continuous supporting of the cover 4 on the support 3. Such an arrangement can be achieved in the form of the pressing device 8 by means of an elastic element, for example a spring, which for example prestresses the combination of support 3 and application head 2 or cutting blade against the cover 4 in a direction so that the cover 4 always lies on the support 3. The cover 4 itself can also be used here as elastic element, as can be seen with regard to the example embodiment according to FIG. 6 described below.

Finally, the sequence of the method according to the invention for introducing the application medium into the weakening gap 5 of the cover 4, wherein the weakening gap 5 has already been introduced completely into the cover 4 chronologically before the introducing of the application medium (over the length thereof), can also be readily seen. On the one hand, the cover 4 is basically prepared. The cover 4 is then already equipped with a complete weakening gap 5 running into the plane of the drawing in FIG. 1. On the other hand, the application device 1 is arranged around the cover 4. The cover 4 is then already securely arranged/clamped on both sides of the weakening gap 5 (FIG. 1) in the base holder. The support 3 is applied against the second side 7 and pressed on in such a way that two flanks 14a and 14b of the weakening gap 5, lying opposite one another, open up above a support region 22, i.e. are moved away from one another substantially in a V-shape. Therefore, the portion of the weakening gap 5 which is situated directly opposite the support 3/support region 22, is always opened up/widened in the direction of the application head 2.

The support 3, together with the application head 2, is arranged in a line with respect to the weakening gap 5. In particular, the application nozzle 13 is directed with its outlet hole in extension towards the support 3. Consequently, during the applying/pressing on of the support 3 against the second side 7 of the cover 4, on a (first) side of the cover 4 lying opposite the support 3, the application head 2 with its application nozzle 13 is arranged exactly above the weakening gap 5, i.e. centrally to the opened up flanks 14a and 14b. For preparation of the introduction of the application medium therefore the cover is arranged between the application head 2 and the support 3 in such a way that the application head 2 is arranged on a first side 6 of the cover 4 having the weakening gap 5, and the support 3 supports the cover from the direction of the second side 7.

Following this, the application medium is introduced into the weakening gap 5 by means of the application nozzle 13/application head 2. The application head 2 and the support 3 are guided here along the extent/extent line of the weakening gap 5 in such a way that a relative movement between the cover 4 and the application head 2 and the support 3 takes place. In the meantime, the support 3 remains always pressed against the second side 7 and therefore the weakening gap 5 remains opened. The application medium is always applied by means of the application nozzle 13 in the portion of the weakening gap 5 situated above the support 3.

Figure 2:
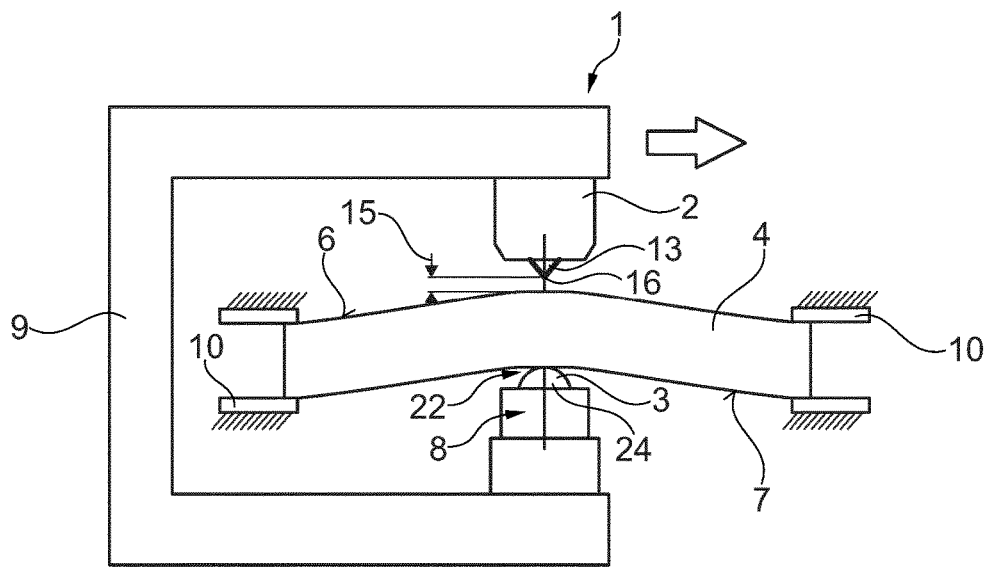

On introducing of the application medium, a distance 15 is kept constant between the application head 2 and the cover 4. As is indicated in FIG. 2, the distance 15 is the direct distance 15 between an outlet tip 16 of the application nozzle 13 facing the cover 4 and a fixed relative point on the first side 6 of the cover 4. In connection with FIG. 2, the guiding along of the application device 1 along the weakening gap 5 can also be seen particularly well. The distance 15 between the outlet tip 16 of the application nozzle 13 and the surface/first side 6 of the cover 4 (viewed outside the weakening gap 5) remains identical during guiding of the application device 1 along the weakening gap 5. This is made possible in particular by a uniform contact pressing force of the support 3 onto the second side 7 of the cover 4. In order to apply the necessary counterforce against the contact pressing force of the support 3, the cover 4 is clamped in a base holder 10.

The weakening gap 5 is therefore preferably opened up completely only in the portion lying opposite the support 3, whereas the further weakening gap 5 is opened up less laterally to the support 5 or is not elastically prestressed at all.

Of course, the support 3 can also be coupled not resiliently as here, but rather rigidly with the connecting arrangement 9.

Furthermore, it is basically also advantageous if a controlling and/or regulating arrangement cooperates with the application head 2 in the method according to the invention, which keeps the distance 15 constant between the application head 2 and the cover 4. For example, this could determine a position of the application head 2 and a position of the support 3 or of the cover 4. When this measured or respectively determined distance deviates from the predetermined distance, the distance can be adjusted/regulated to the predetermined distance for example by corresponding raising or lowering of the automated moving device 11 directly during the applying.

In addition, the invention relates to a method for processing/producing the cover 4, wherein this method comprises the previously described method for introducing the application medium. Before this introduction method, firstly here the weakening gap 5 is introduced/formed completely on the first side 6 of the cover 4 by means of a separating tool in the form of a cutting tool. Only following on therefrom, and after removal of the separating tool from the cover 4 is the method then implemented for introducing the application medium, as previously described.

Figure 3:
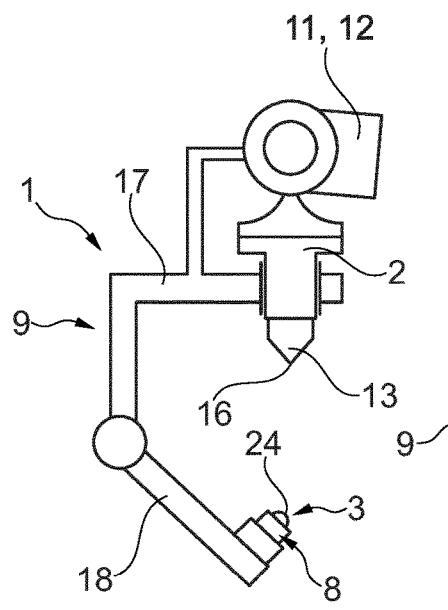
Figure 4:
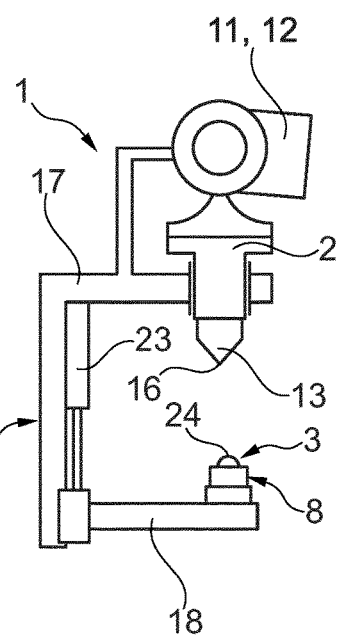
Figure 5:
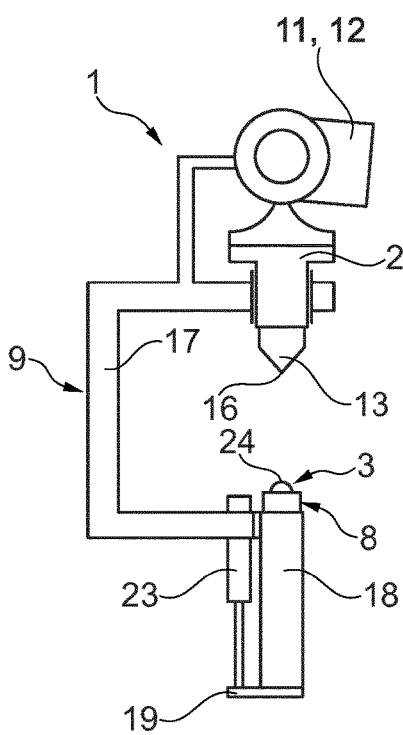

In connection with FIGS. 3 to 5, basically also easily modified example embodiments of the application device 1 are illustrated, which is basically constructed and functions like the application device 1 of FIG. 1. In these further example embodiments, the support 3 and the multi-part connecting arrangement 9 is always basically coupled differently with the application head 2. The connecting arrangement 9 in these embodiments is respectively configured having several parts, wherein a first component 17, which has the application head 2, is movable/displaceable relative to a second component 18, which receives the support 3.

According to FIG. 3, the two components 17, 18, configured as arms, are preferably connected pivotably with one another via an electrical or mechanical coupling connection/device. The coupling connection/device is in turn a component of the controlling and/or regulating arrangement, so that during operation the distance between support 3 and application head 2 are pivoted by activation of the coupling connection/coupling device/controlling and/or regulating arrangement.

According to FIG. 4, however, it is also possible to provide a fluidic, such as pneumatic or hydraulic, activation of the two components 17 and 18. Here, a pneumatic control cylinder 23 of the controlling and/or regulating arrangement is arranged between the components 17 and 18, and the components 17 and 18 are guided with respect to one another so that the components 17 and 18 are displaced relative to one another on activation of the control cylinder 23.

In FIG. 5 the second component 18, receiving the support 3, is arranged in a stationary/fixed manner, compared with the example embodiment according to FIG. 4, i.e. on a fixed component 19.

In other words, according to the advantageous example embodiments of FIGS. 3 to 5, the bracket formed by the connecting arrangement 9 is therefore always formed in at least two parts, wherein between the two bracket parts/components 17, 18 a movable coupling arrangement is provided, in order to enable a relative movement (moving, pivoting) of the two bracket parts 17, 18 relative to one another. Such a relative movement can be provided in the form of a pivoting or a displacement. Of course, the two bracket parts 17, 18 are able to be secured themselves against one another during the carrying out of the application process—therefore of the media input. In order to achieve an application track, i.e. to apply the application medium along the weakening gap, the application head 2 and cover 4 are movable relative to one another. Here, either the application head 2 alone or the cover 4 alone, but also both elements 2, 4 can be moved with respect to one another at the same time.

In other words, alternatively to the first example embodiment of FIGS. 1 and 2, wherein a rigid connection of application head 2 and support 3 is implemented, it is expedient to adjust both elements—application head 2 and support 3, which are preferably adjustable with respect to one another—by means of the controlling and/or regulating arrangement, so that the above-mentioned predefined distance 15 is always ensured. For this purpose respectively in the application axis/spray axis the position of the support 3 and/or the position of the application head 2 and/or the position of the cover 4 is to be detected. The two positions are then delivered to the controlling and regulating arrangement, which determines therefrom the distance 15 between the outlet tip 16 and the support 3. According to this signal, a drive either for the application head 2 or the support 3 or possibly also for both arrangements 2, 3 can be activated so that in a regulating method the distance is reliably set for achieving a desired application distance 15.

Figure 6:
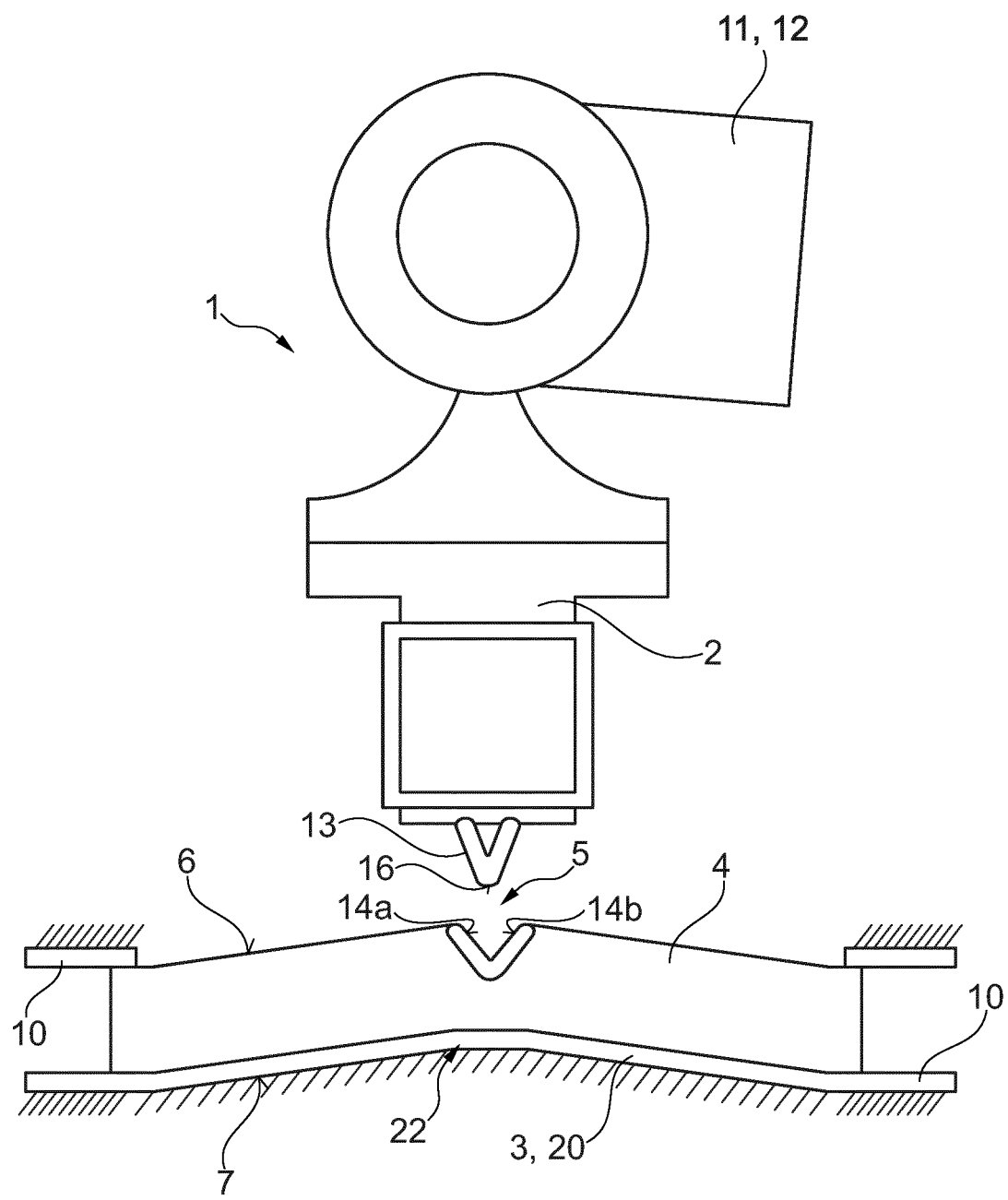

According to FIG. 6 it is basically also possible to provide the application device 1 for carrying out the method with an application head 2 and with a support 3 formed separately from the application head 2. The support 3 is embodied here as a base plate 20/support plate of a support table, formed separately from the application head 2. The base plate 20 can be equipped directly with the base holder 10. In the present example embodiment, the base plate 20 is equipped directly with the base holder 10. The base plate 20 is, in addition, configured in a curved/convexly curved manner. The cover 4 is clamped in the base holder 10 in such a way that at least in the region of the weakening gap 5 it lies on the base plate 20 likewise with the second side 7. A relative movement of the cover 4 relative to the support 3 preferably does not take place during the applying of the application medium, wherein only the application head 2 is guided along the weakening gap 5 by means of the automated moving device 11. Alternatively, however, it is also possible to move the base plate 20 basically relative to the cover 4. Therefore, in this embodiment, the cover 4 is already itself prestressed on placing on the support 3.

Figure 7:
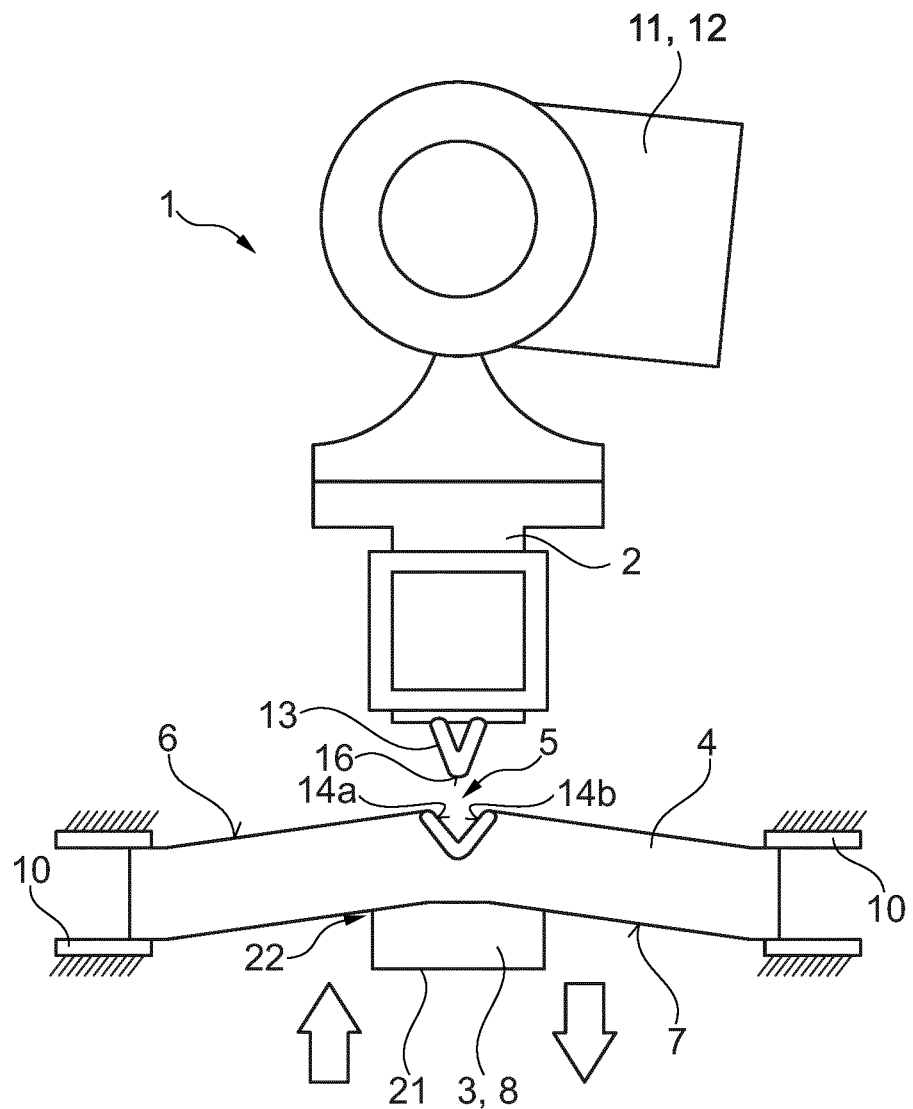

Furthermore, as indicated in FIG. 7, it is also possible to dispense with the base plate 20 and to provide a movable supporting block 21. The supporting block 21 is then movable in the direction of the application head 2 and, in turn, away from this application head 2. Thereby, different prestressing states of the cover 4 can be implemented in the region of the weakening gap 5. In the example embodiment according to FIG. 7, an advanceable presser geometry by means of the supporting block 21 in corresponding geometric embodiment makes provision that the weakening gap 5 in the cover 4 is opened in such a way that over the entire course the weakening gap 5 is bent open/opened up for the application of the application medium. This pusher geometry can be advanced pneumatically or electromechanically into the product mount from the A side/second side 7 of the cover 4.

In other words, therefore in the further embodiments of FIGS. 6 and 7 the mechanical coupling of the support 3 with the application head 2 via a tool embodiment is dispensed with.

Alternatively, as implemented in FIG. 6 in a product mount in which the cover 4 is inserted, a convex contour can already be contained. Here, a contour clamping mask in the form of the base holder 10 clamps the cover 4 over the convex contour/bulge/curvature in such a way that the opening up effect can be achieved without the use of vacuum. Further preferably, however, the cover 4 is clamped via a vacuum in the direct environment of the contour within the product mount and the weakening gap 5 is opened up.

LIST OF REFERENCE NUMBERS

1 application device
2 application arrangement/application head
3 support
4 cover
5 weakening gap
6 first side
7 second side
8 pressing device
9 connecting arrangement
10 base holder
11 automated moving device
12 arm
13 application nozzle
14a first flank
14b second flank
15 distance
16 outlet tip
17 first component
18 second component
19 fixed component
20 base plate
21 supporting block
22 support region
23 control cylinder
24 rolling ball

What is claimed is:

1. A method for introducing an application medium into a cover, the method comprising the steps of:
   providing the cover having a preformed weakening gap formed completely over a length thereof on a first side;
   after providing the cover, clamping the cover at opposite first and second ends thereof;
   positioning an application arrangement toward the first side, at a distance from the cover and above the preformed weakening gap, wherein a support is arranged in a supporting manner on a second side of the cover, facing away from the application arrangement; and
   applying the application medium into the preformed weakening gap by ejecting the application medium from the application arrangement, wherein the cover is stationary with respect to the application arrangement, and the application medium is further applied into the preformed weakening gap by translating the application arrangement over the length of the cover, wherein the support is coupled to the application arrangement and translates therewith.

2. The method according to claim 1, wherein the cover is applied on the support such that the preformed weakening gap, in a portion which lies opposite a support region applied on the support, opens up locally in the direction of the application arrangement.

3. The method according to claim 1, wherein the support is pressed resiliently onto the second side of the cover via a pressing device having a spring element.

4. The method according to claim 1, wherein the application medium is a separating medium or an adhesive means temporarily at least partly re-closing the preformed weakening gap.

5. The method according to claim 1, wherein the cover is displaced relative to the application arrangement and/or the application arrangement is displaced relative to the cover in such a way that a distance is kept constant between the application arrangement and the cover in a displacement path along the preformed weakening gap.

6. The method according to claim 5, wherein a controlling and/or regulating arrangement is present, which keeps constant the distance between the application arrangement and the cover in the displacement path along the preformed weakening gap.

7. The method according to claim 1, wherein the application arrangement is coupled indirectly or directly with the support.

* * * * *